United States Patent
Kumar et al.

(10) Patent No.: US 10,838,735 B2
(45) Date of Patent: Nov. 17, 2020

(54) SYSTEMS AND METHODS FOR SELECTING A TARGET HOST FOR MIGRATION OF A VIRTUAL MACHINE

(71) Applicant: Nutanix, Inc., San Jose, CA (US)

(72) Inventors: Abhishek Kumar, Uttarakhand (IN);
Prerna Saxena, Bangalore (IN);
Ramashish Gaurav, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 131 days.

(21) Appl. No.: 16/214,017

(22) Filed: Dec. 7, 2018

(65) Prior Publication Data
US 2020/0183703 A1    Jun. 11, 2020

(51) Int. Cl.
*G06F 9/455* (2018.01)
*G06F 9/38* (2018.01)
*G06F 9/50* (2006.01)

(52) U.S. Cl.
CPC ........ *G06F 9/3891* (2013.01); *G06F 9/45558* (2013.01); *G06F 9/5022* (2013.01); *G06F 2009/4557* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,037,717 B2 | 5/2015 | Canturk et al. | |
| 9,772,866 B1 | 9/2017 | Aron et al. | |
| 2007/0118414 A1* | 5/2007 | Asaki | G06F 9/505 709/238 |
| 2018/0139148 A1* | 5/2018 | Gamage | H04L 47/822 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.

(Continued)

*Primary Examiner* — Gregory A Kessler
(74) *Attorney, Agent, or Firm* — Foley & Lardner LLP

(57) ABSTRACT

An illustrative embodiment disclosed herein is a cluster including a plurality of host devices. The plurality of host devices include a first host device. The cluster further includes a cluster controller that receives indication of a contention on the first host device. The cluster controller selects a plurality of candidate host devices among the plurality of host devices based on a plurality of host CPU usages of the plurality of candidate host devices. The cluster controller computes a plurality of projected CPU usages of the plurality of candidate host devices. The cluster controller selects a target host device among the plurality of candidate host devices based on the plurality of projected CPU usages of the plurality of candidate host devices.

27 Claims, 3 Drawing Sheets

(56) References Cited

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Cano, Ignacio, et al. "Curator: Self-Managing Storage for Enterprise Clusters" (Mar. 27, 2017), from https://www.usenix.org/conference/nsdi17/.

* cited by examiner

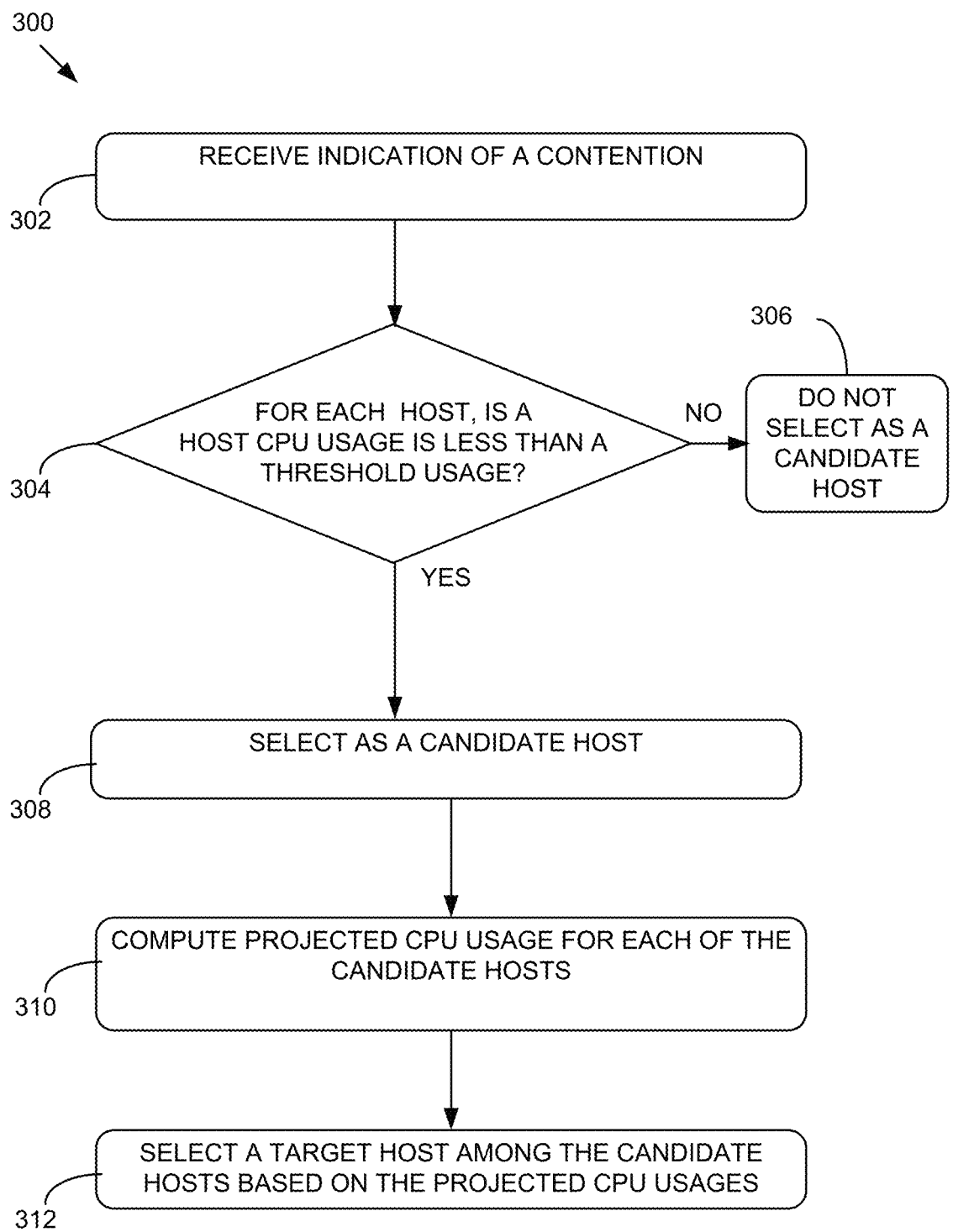

SYSTEMS AND METHODS FOR SELECTING A TARGET HOST FOR MIGRATION OF A VIRTUAL MACHINE

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource usage and performance efficiency. However, the present day virtual computing systems have limitations due to their configuration and the way they operate.

SUMMARY

Aspects of the present disclosure relate generally to a virtualization environment, and more particularly to a method of selecting VMs for migration. Technical solutions benefit by improving network bandwidth and efficiently using hardware resources.

An illustrative embodiment disclosed herein is a cluster including a plurality of host devices. The plurality of host devices include a first host device. The cluster further includes a cluster controller that receives indication of a contention on the first host device. The cluster controller selects a plurality of candidate host devices among the plurality of host devices based on a plurality of host CPU usages of the plurality of candidate host devices. The cluster controller computes a plurality of projected CPU usages of the plurality of candidate host devices. The cluster controller selects a target host device among the plurality of candidate host devices based on the plurality of projected CPU usages of the plurality of candidate host devices.

Another illustrative embodiment disclosed herein is a method including receiving, by a cluster controller, indication of a contention on a first host device of a plurality of host devices in a cluster. The method further includes selecting, by the cluster controller, a plurality of candidate host devices among the plurality of host devices based on a plurality of host CPU usages of the plurality of candidate host devices. The method further includes computing, by the cluster controller, a plurality of projected CPU usages of the plurality of candidate host devices. The method further includes selecting, by the cluster controller, a target host device among the plurality of candidate host devices based on the plurality of projected CPU usages of the plurality of candidate host devices.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 is an example method for selecting a target host for migrating a user VM, in accordance with some embodiments of the present disclosure.

Figure 1:
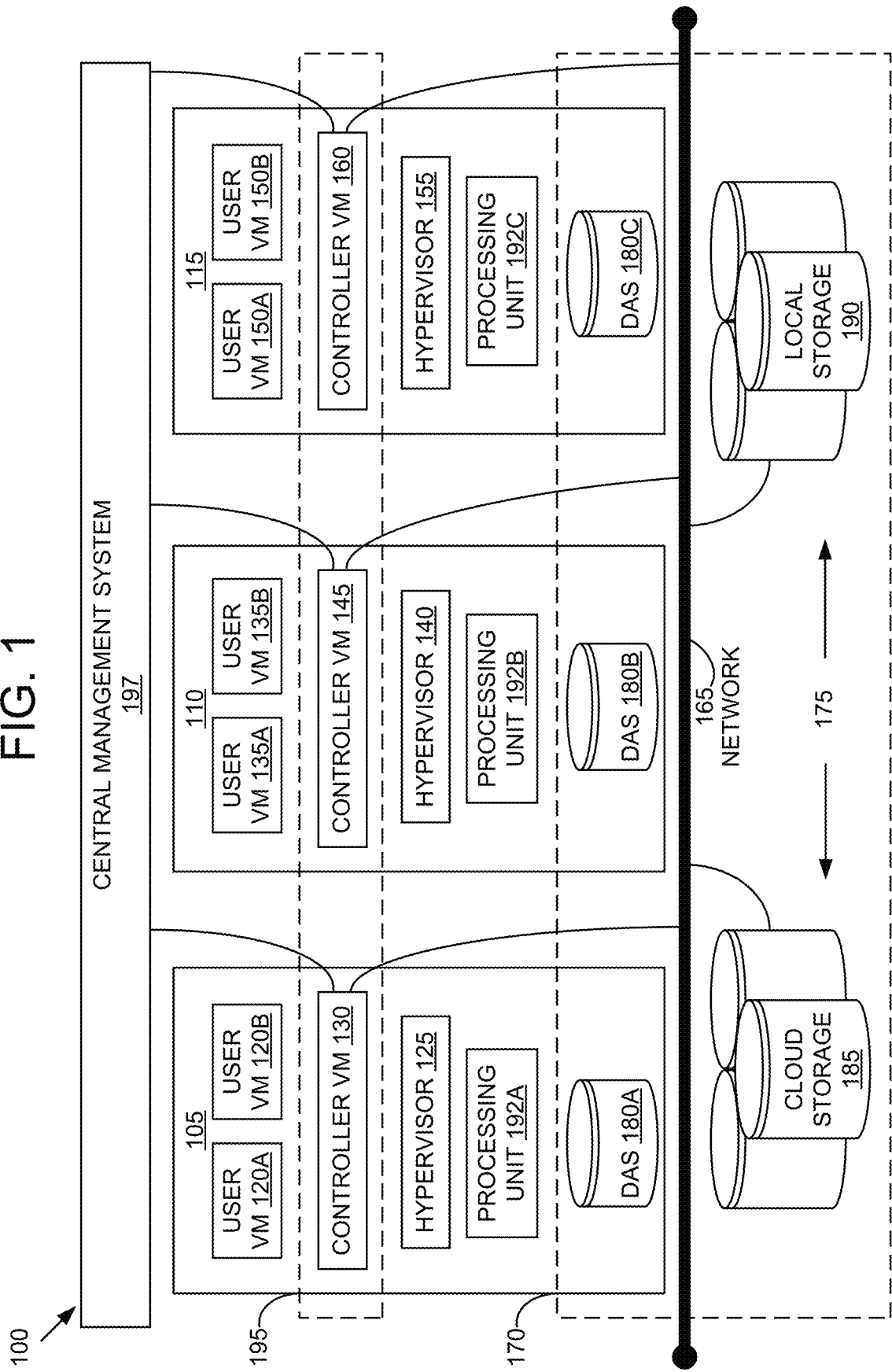
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Multiple virtual machines ("VMs"), which are running on a given host, may share, via a hypervisor of the host, underlying physical central processing units ("CPUs"). There may be contention for the CPUs such that some of the VMs requesting CPUs may wait to use the CPUs. A first VM to be migrated may be identified. Systems not disclosed herein using methods not disclosed herein may determine a target host to migrate the first VM to at the instant the first VM faces resource contention. However, the target host may soon experience a contention due to the addition of the first VM. Such an approach will lead to too many VM migrations.

One technical challenge is reducing CPU contention. CPU contention may result in VM workloads taking longer to complete. CPU contention may also be an indication that hardware resources such as CPUs on other hosts are idle and VMs are not being properly assigned to those other hosts. Another technical challenge is minimizing the number of times CPU contention occurs in the future. Every time a CPU contention is detected, cluster controllers or their equivalents run the target host selection process. The target host selection process may involve requests and responses between different hosts, different clusters, and different data centers. Too many occurrences of CPU contention may result in a reduction in network bandwidth. Another technical challenge is to reduce the number of computations needed to determine whether a host may be selected as a target host for migration. By expending hardware resources on these computations, the hardware resources cannot be used to process VM workloads, which may contribute a delay in the time needed to process VM workloads.

The disclosure described herein proposes systems and methods for selecting a target host for migration of a virtual machine. The disclosure includes a technical solution to the technical challenge of reducing CPU contention when it is discovered and simultaneously minimizing the number of future CPU contention occurrences. The disclosure applies machine learning to predict the CPU usage of each of the hosts, based on historical data on the past CPU usage of each of the hosts. Using machine learning, it is possible to derive that, for a given look-ahead period, a host's total CPU usage in the future, may be estimated. Then, the system can make a determination of which host the VM should be migrated to so that less CPU contentions occur in the future. This can result in an improvement of network bandwidth.

The disclosure includes a technical solution to the technical challenge of reducing the number of computations needed to determine whether a host is to be selected as a target host for VM migration. First, for each of the hosts in the cluster, the system selects only the candidate hosts whose CPU usages are lower than a threshold. Next, for each of the candidate hosts, the system aggregates the host's CPU usage with the CPU usage of the VM to be migrated and chooses the target host having the lowest aggregated CPU usage. By selecting only a subset of hosts with a specific CPU usage profile before performing aggregation and final selection, the system greatly reduces the number of computations needed to select the target host that the VM is to be migrated to. Reducing the number of computations may lead to more available resources, thus reducing the number of resources required to run a datacenter and/or reducing the length of time for completing VM workloads. In some embodiments, the threshold may be varied to optimally balance between the effectiveness of target host selection and the minimization of the number of computations for target host selection.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host," "host device," or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (depicted as local storage 190 in FIG. 1). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server, in which case each of the first node 105, the second node 110, and the third node 115 may be referred to as a host device. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including central processing unit (CPU), memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource usage and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Virtual Machine Selection of Target Host

Figure 2:
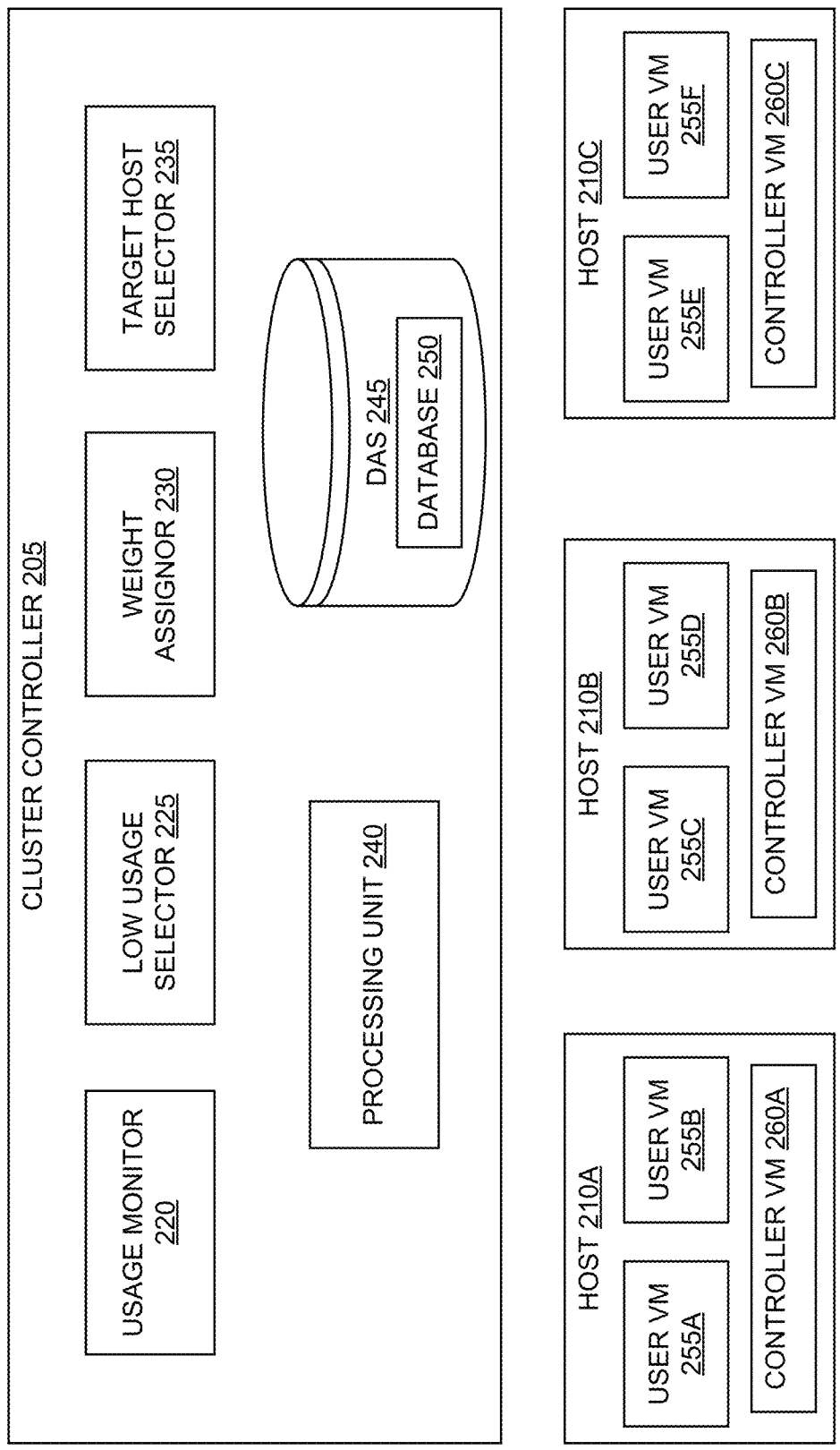
FIG. 2 is an example block diagram of a cluster for selecting a target host for migration of a virtual machine, in accordance with some embodiments of the present disclosure.

Referring now to FIG. 2, a cluster 200 for selecting a target host for migration of a virtual machine is shown. In brief overview, the cluster 200 may include a cluster controller 205, a host 210A, a host 210B, and a host 210C. The cluster controller 205 may include a usage monitor 220, a low usage selector 225, a weight assignor 230, a target host selector 235, a processing unit 240 and a DAS 245. The DAS 245 may include a database 250. The host 210A may include a user VM 255A, a user VM 255B, and a controller VM 260A. The host 210B may include a user VM 255C, a user VM 255D, and a controller VM 260B. The host 210C may include a user VM 255E, a user VM 255F, and a controller VM 260C.

The cluster 200 may be an instance of the virtual computing system 100 with respect to FIG. 1. The cluster controller 205 may be an instance of the central management system 197 with respect to FIG. 1. The host 210A, the host 210B, and the host 210C may be instances of the node 105, the node 110, and the node 115, respectively, described with respect to FIG. 1. The host 210A, the host 210B, and the host 210C are collectively referred to herein as the hosts 210. The user VM 255A, the user VM 255B, the user VM 255C, the user VM 255D, the user VM 255E, and the user VM 255F may be instances of the user VM 120A, the user VM 120B, the user VM 135A, the user VM 135B, the user VM 150A, and the user VM 150B, respectively, described with respect to FIG. 1. The user VM 255A, the user VM 255B, the user VM 255C, the user VM 255D, the user VM 255E, and the user VM 255F are collectively referred to herein as user VMs 255. The controller VM 260A, the controller VM 260B, and the controller VM 260C may be instances of the controller VM 130, VM 145, and VM 160, respectively, described with respect to as FIG. 1. The controller VM 260A, the controller VM 260B, and the controller VM 260C are collectively referred to herein as the controller VMs 260. The processing unit 240 may be an instance of the processing unit 192A described with respect to FIG. 1. The DAS 245 may be an instance of the DAS 180A described with respect to FIG. 1.

Although three hosts (e.g., the host 210A, the host 210B, and the host 210C) are shown in the cluster 200, in other embodiments, greater than or fewer than three hosts may be used. Although two user VMs per host (e.g., the user VM 255A and the user VM 255B in the host 210A) are shown in the cluster 200, in other embodiments, greater than or fewer than two user VMs may be used in some or all of the hosts 210. Although one processing unit (e.g. the processing unit 240) and one DAS (e.g. the DAS 245) are shown in the cluster controller 205, in other embodiments, greater than one processing unit and/or one DAS may be used in the cluster controller 205.

Each of the controller VMs 260 may be configured to observe, for all local user VMs, a scheduling state once in every sampling period. The local user VMs relative to the controller VM are the user VMs which reside on a same host as the controller VM. The scheduling state that is observed may be at least one of a CPU usage state, a CPU steal state, and a CPU idle state. The CPU usage state may be a state wherein a first user VM (e.g. the user VM 255A) of the user VMs 255 uses one of the CPU resources. The CPU steal state may be a state wherein the first user VM is deprived of running on a CPU when it was in fact entitled to. If the scheduling state is not either of the CPU usage state or the CPU steal state, then the scheduling state may be the CPU idle state. The observed scheduling state may reflect a VMs current CPU activity (e.g. using, waiting, or idle) or a VMs activity during a previous sampling period.

Each of the controller VMs 260 may be configured to compute scheduling statistics for its local user VMs and a local host. The local host relative to the controller VM is the host on which the controller VM resides. Each of the controller VMs 260 may compute the scheduling statistics for the local host by aggregating the scheduling statistics for all the local user VMs. Each of the scheduling statistics may include an array of scheduling statistical samples that fall within a statistical time window. In some embodiments, each of the controller VMs 260 may be configured to compute a scheduling statistical sample once for every sampling period. Each scheduling statistical sample may be associated with a different time instance in the statistical time window and the time instances may be spaced one sampling period apart. The computation may be performed once for every sampling period. The statistical time window moves with respect to the statistical scheduling samples as time progresses. The sampling period may be an integer number of clock cycles of a clock implemented in hardware such as a piezoelectric crystal oscillator or the processing unit 240.

The scheduling statistics may include CPU usage, CPU steal, and CPU idle for each of the local user VMs and the local host. CPU usage may be an amount of time that the first user VM uses one of the CPU resources. CPU steal may be an amount of time that the first user VM is deprived of running on a CPU when it was in fact entitled to. CPU idle may be an amount of time of the first user VM's activity that is not either of the CPU usage or the CPU steal. CPU usage, CPU steal, and CPU idle may be represented as units of time (e.g. nanoseconds), units of percentage of time in the statistical time window (%), or ratios (unit-less). Each of the scheduling statistics (e.g. CPU usage) may contain an array of statistical samples (e.g. CPU usage samples). The CPU usages of the local VMs may be referred to as VM CPU usages. The CPU usages of the local hosts (e.g. the hosts 210) may be referred to as host CPU usages.

Each of the controller VMs 260 may be configured to store the scheduling statistics and/or the scheduling states in a database, such as the database 250. Each of the controller VMs 260 may be configured to store, as data entries in the database, a number of most recent scheduling statistical samples which span the statistical time window. Each data entry may include one or more of the addresses in the database. Responsive to computing a most recent scheduling statistical sample and determining that all addresses allocated for storing scheduling statistical samples have the scheduling statistical samples stored thereon, each of the controller VMs 260 may be configured to overwrite addresses of a data entry having the least recent scheduling statistical sample with the most recent scheduling statistical sample. The database may be located on the DAS of the respective host (e.g. DAS 180A in FIG. 1), the NAS (e.g. NAS 175 in FIG. 1), the DAS 245, or a cache of the processing unit 240.

The CPU usage may be an observed CPU usage, a desired CPU usage, or both. The observed CPU usage may be computed as a ratio of a number of CPU usage states in a time interval and a number of scheduling states in the same time interval. For example, at t=0, the first user VM has a CPU steal state, at t=5 the first user VM has a CPU usage state, and at t=10 the first user VM has a CPU idle state. At t=5, the controller VM 260 may compute the observed CPU usage as 50%, the CPU idle as 0%, and the CPU steal as 50% based on the states at t=0 and t=5. At t=10, the controller VM 260 may compute the observed CPU usage as 50%, the CPU idle as 50%, and the CPU steal as 0% based on the states at t=5 and t=10. The desired CPU usage may be computed as a ratio of a number of CPU usage states in a time interval and a sum of a number of CPU usage states and a number of CPU idle states in the same time interval. Thus, for the previous example, the controller VM 260 may compute the desired CPU usage as 100% at t=5 and 50% at t=10. The desired CPU usage may be computed as a ratio of the observed CPU usage and a sum of the observed CPU usage and the CPU steal.

The scheduling statistics may include historical scheduling statistics, look-ahead scheduling statistics, or both. Historical scheduling statistics are scheduling statistics about a VMs' CPU activity in the past. Look-ahead scheduling statistics are scheduling statistics about the VMs' CPU activity in the future. For example, a CPU usage may include a historical CPU usage, a look-ahead CPU usage, or both. Each of the controller VMs 260 may compute historical scheduling statistics directly from the scheduling states, as described in the preceding paragraphs. The statistical time window for historical scheduling statistics may be referred to as a historical time window. The statistical time window for look-ahead scheduling statistics may be referred to as a look-ahead time window.

Each of the controller VMs 260 may be configured to predict look-ahead scheduling statistics in the look-ahead time window based on processing the historical scheduling statistics that fall within the historical time window. Each of the controller VMs 260 may be configured to use machine learning to predict the look-ahead scheduling statistics. In some embodiments, the length of look-ahead window is a fraction (e.g. one half) of the length of historical time window. For example, to determine look-ahead scheduling statistics for a next hour, each of the controller VMs 260 may be configured to process the historical scheduling statistics for a last two hours.

The cluster controller 205 may include a usage monitor 220. The usage monitor 220 may be configured to receive an alert from one of the hosts 210. The alert may include an alert that there is a resource contention among the local VMs of the host to utilize local CPUs (e.g. CPUs local to the controller VM 260 reporting the alert). As used herein, resource contention (herein referred to as "contention") may be defined as a state during which the a CPU usage (e.g. the host CPU usage) is above a contention threshold usage. In some embodiments, the alert includes indication of the user VM to be migrated. In some embodiments, the usage monitor 220 periodically accesses (e.g. by retrieving from the database 250) the host CPU usages to determine if there is the contention. The usage monitor 220 may be configured to compare, for each of the hosts 210, the host CPU usage to the contention threshold usage. The usage monitor 220 may be configured to compare the host CPU usage of each of the hosts 210 to the contention threshold usage in series. For example, at a first time, the usage monitor 220 compares the host CPU usage of the host 210A to the contention threshold usage, and a second time later than the first time, the usage monitor 220 compares the host CPU usage of the host 210B to the contention threshold usage. In some embodiments, the usage monitor 220 compares the host CPU usage of each of the hosts 210 to the contention threshold usage in parallel. The usage monitor 220 may be configured to receive the contention threshold usage from an input device (e.g. keyboard or mouse) associated with the cluster controller 205.

The cluster controller 205 may include a low usage selector 225. The low usage selector 225 may be configured to access the host CPU usages. The low usage selector 225 may be configured to select a subset of the hosts 210 (referred to herein as "candidate hosts"). The low usage selector 225 may be configured to select a first host (e.g. the host 210A) as one of the candidate hosts responsive to determining that the host CPU usage of the first host is lower than a host threshold usage (e.g. all of the host CPU usage samples within the statistical time window of the first host are lower than the host threshold usage). The low usage selector 225 may be configured to receive the host threshold usage from the input device associated with the cluster controller 205. The low usage selector 225 may be configured to determine or adjust the host threshold usage based on criteria. The criteria may include an amount or percentage of the hosts 210 selected as the candidate hosts. In some embodiments, the amount or percentage of the hosts 210 that were selected as the candidate hosts in previous selections is stored in the database. The criteria may include computing an average or peak or some other function of the amount or percentage of the hosts 210 historically selected as the candidate hosts. The criteria may include how often or for what percentage of time the usage monitor 220 is receiving alerts of contention or determining contention within a pre-determined time interval.

The cluster controller 205 may include a weight assignor 230. The weight assignor 230 may be configured to assign a weight to each of the candidate hosts. The weight assignor 230 may be configured to assign the weight that is inversely proportional to (or as some function of) the average of the host CPU usage samples within the statistical time window. In some embodiments, the weight assignor 230 is configured to assign the weight that is inversely proportional to a number of host CPU usage samples, for a candidate host and within the statistical time window, being less than a second pre-determined threshold. The weight assignor 230 may be configured to assign a weight that is an average of two or more weights based on the aforementioned metrics. In some embodiments, the weight assignor 230 is configured to rank the outlier VMs based on some or all of the aforementioned metrics.

The cluster controller 205 may include the target host selector 235. The target host selector 235 may be configured to select a target host from the candidate hosts. The target host selector 235 may be configured to access the CPU usage of the user VM to be migrated (referred to herein as the "target VM" whose CPU usage is referred to as "target VM CPU usage"). The target host selector 235 may be configured to access the host CPU usages for each of the candidate hosts. For each of the candidate hosts, the target host selector may add the target VM CPU usage to the host CPU usage (corresponding to the candidate host) to arrive at a projected CPU usage. In an illustrative example, a first candidate host has a host CPU usage H1, a second candidate host has a host CPU usage H2, a third candidate host has a host CPU usage H3, and a target VM has a target VM CPU usage V1. The target host selector 235 may compute for the first candidate host a projected CPU usage P1=H1+V1, for the second candidate host a projected CPU usage P2=H2+V1, and for the third candidate host a projected CPU usage P3=H3+V1.

In some embodiments, the target host selector 235 is configured to select as the target host the candidate host with the lowest projected CPU usage. Each project CPU usage may have multiple projected CPU usage samples within the statistical time window. The target host selector 235 may be configured to determine the candidate host with lowest projected CPU usage as the projected CPU usage having a lowest maximum projected CPU usage sample, as compared to the maximum projected CPU usage samples of other candidate hosts. The maximum projected CPU usage sample of a candidate host may be a projected CPU usage sample having a highest value among the projected CPU usage samples of the candidate host within the statistical time window.

For example, a first candidate host, the host 210A, has a first projected CPU usage sample of 40% and a second projected CPU usage sample of 50%. A second candidate host, the host 210B, may have a third projected CPU usage sample of 35% and a fourth projected CPU usage sample of 45%. The maximum projected CPU usage sample for the first candidate host may be the second projected CPU usage sample and the maximum projected CPU usage sample for the second candidate host may be the fourth projected CPU sample. The lowest maximum projected CPU usage sample may be selected from the second projected CPU usage sample and the fourth projected CPU sample. In this example, the target host selector 235 selects the second candidate host as the target host because the fourth projected CPU usage sample is the lowest maximum projected CPU usage sample.

In some embodiments, the target host selector 235 is configured to select as the target host the candidate host with the lowest average projected CPU usage. The average projected CPU usage of a candidate host may be computed as an average of the projected CPU usage samples of the candidate host within the statistical time window. In some embodiments, the target host selector 235 compares the projected CPU usages of each of the candidate hosts to a fixed threshold usage in order of the weight or rank of the candidate hosts. Responsive to finding a first candidate host with a projected CPU usage (e.g. an average of the projected CPU usage samples or a maximum CPU usage sample) below the fixed threshold usage, the target host selector 235 may select the first candidate host as the target host and the target host selector 235 may stop comparing other candidate hosts to the fixed threshold usage.

In some embodiments, the cluster controller 205 may be configured to migrate the target VM from a first host (referred to herein as a "source host") to the target host. The cluster controller 205 may be configured to copy memory pages (and/or configuration files) corresponding to the target VM from the source host to the target host while the target VM is still running on the source host. Responsive to some of the memory pages being updated on the source host after being copied, the cluster controller 205 may be configured to re-copy the updated memory pages to the target host. The re-copy may be an incremental copy of only the changed portions of the updated memory pages. Responsive to detecting that no or minimal memory pages have changed since the last iteration of copying and/or re-copying, the cluster controller 205 may be configured to stop the target VM on the source host and resume the target VM on the target host.

Each of the elements or entities of the virtual computing system 100 and the cluster 200 (e.g. cluster controller 205, the usage monitor 220, the low usage selector 225, the weight assignor 230, and the target host selector 235) is implemented using hardware or a combination of hardware or software, in one or more embodiments. For instance, each of these elements or entities can include any application, program, library, script, task, service, process or any type and form of executable instructions executing on hardware of the cluster 200. The hardware includes circuitry such as one or more processors (e.g. the processing unit 240) in one or more embodiments. Each of the one or more processors is hardware.

Although described with respect to the cluster 200, the systems and methods described herein may be applied to datacenters or clouds without departing from the spirit and the scope of the disclosure.

Referring now to FIG. 3, an example method 300 for selecting a target host for migrating a user VM is shown. The method 300 selecting a target host for migrating a user VM may be implemented using, or performed by, the components of the cluster 200 detailed herein with respect to FIG. 2. Additional, fewer, or different operations may be performed in the method 300 depending on the embodiment. In brief overview of the method 300, a cluster controller receives indication of a contention (302). The cluster controller determines whether a host CPU usage is less than a threshold usage for each host (304). Responsive to determining that the host CPU usage of a host is not less than a threshold usage, the cluster controller does not select the host as a candidate host (306). Responsive to determining that the host CPU usage of the host is less than a threshold usage, the cluster controller selects the host as candidate host (308). The cluster controller computes a projected CPU usage for each of the candidate hosts (310). The cluster controller selects a target host among the candidate hosts based on the projected CPU usages (312).

At operation 302, a cluster controller, such as the cluster controller 205, receives indication of a contention occurring on one of the hosts, such as one of the hosts 210, corresponding to the cluster controller. In some embodiments, the hosts are on a same cluster as the cluster controller. Receiving the indication of the contention may include receiving an indication of the contention from the host on which the contention is occurring. Receiving the indication of the contention may include receiving an indication of a target VM, such as the user VM 255A, that is to be migrated. The target VM may be on the contentious host. In some embodiments, receiving the indication of the contention includes periodically accessing, by the cluster controller, the host CPU usages associated with the hosts. Responsive to determining that one of the host CPU usages are greater than a contention threshold, the cluster controller may receive the indication of the contention.

At operation 304, the cluster controller determines whether a host CPU usage is less than a threshold usage for each host. Determining whether the host CPU usage is less than the threshold usage for each host may include determining for each of the hosts that the maximum host CPU usage sample of a host within a statistical time window is lower than the host threshold usage. In some embodiments, determining whether the host CPU usage is less than the threshold usage for each host includes determining for each of the hosts that an average host CPU usage of host CPU usage samples in a statistical time window is lower than the host threshold usage. In some embodiments, responsive to selecting the candidate hosts, the cluster controller assigns weights to each of the candidate hosts. Assigning the weights to each of the hosts may include assigning weights that are inversely proportional to the average host CPU usage of each of the candidate hosts. At operation 306, responsive to determining that the host CPU usage of a host is not less than a threshold usage, the cluster controller does not select the host as a candidate host. At operation 308, to determining that the host CPU usage of the host is less than a threshold usage, the cluster controller selects the host as candidate host.

At operation 310, the cluster controller computes a projected CPU usage for each of the candidate hosts. Computing the projected CPU usage for each of the candidate hosts may include adding a CPU usage of the target VM to the host CPU usage of each of the candidate hosts. In some embodiments, computing the projected CPU usage for each of the candidate hosts may include adding each of the CPU usage samples of the target VM to the corresponding host CPU usage samples of each of the candidate hosts. The samples can be computed in series. In some embodiments, responsive to a projected CPU usage sample being higher than a pre-determined threshold, the cluster controller stops computing samples for the corresponding candidate host. Then the cluster controller may discard the corresponding candidate host.

At operation 312, the cluster controller selects a target host among the candidate hosts based on the projected CPU usages. Selecting the target host among the candidate hosts based on the projected CPU usages may include determining a maximum projected CPU usage sample (e.g. having a highest value) of the projected CPU usage for each of the candidate hosts. Selecting the target host among the candidate hosts based on the projected CPU usages may include selecting a target host having the lowest maximum projected CPU usage sample among the maximum projected CPU usage samples of the candidate hosts.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A cluster comprising a processor having programmed instructions that when executed cause the processor to:
    identify, for each host device of a plurality of host devices, a host central processing unit (CPU) usage of a plurality of host CPU usages;
    select at least a plurality of candidate host devices among the plurality of host devices based on host CPU usages of the respective host device;
    compute, for each candidate host device, a projected host CPU usage by adding a virtual machine CPU usage of a virtual machine to be migrated to the respective host CPU usage;
    select a target host device among the plurality of candidate host devices based on the respective projected host CPU usages of the target host device; and
    migrate the virtual machine from a first host device of the plurality of host devices to the target host.

2. The cluster of claim 1, wherein selection of the plurality of candidate host devices among the plurality of host devices is responsive to receiving an indication of a contention on the first host device.

3. The cluster of claim 1, wherein the processor having further programmed instructions to determine that each candidate host device of the candidate host devices has a first CPU usage of the plurality of host CPU usages, the first CPU usage decreasing a host threshold usage.

4. The cluster of claim 1, wherein the processor having further programmed instructions to assign a weight to each candidate host device based on the host CPU usage of the candidate host device.

5. The cluster of claim 4, wherein each host CPU usage comprises a plurality of host CPU usage samples, and wherein, for each candidate host device, the weight is inversely proportional to an average of the plurality of host CPU usage samples of the candidate host device.

6. The cluster of claim 1, wherein the processor having further programmed instructions to compute a sum of the host CPU usage of the candidate host device and a CPU usage of the virtual machine.

7. The cluster of claim 1, wherein each projected CPU usage comprises a plurality of projected CPU usage samples, and wherein the processor has further programmed instructions to determine, for each candidate host device, a maximum projected CPU usage sample of a plurality of maximum projected CPU usage samples, the maximum CPU usage sample having a highest value among the plurality of projected CPU usage samples of the candidate host device.

8. The cluster of claim 7, the processor having further programmed instructions to determine a first candidate host device of the plurality of candidate host devices, the first candidate host device having a first maximum projected CPU usage sample of the plurality of maximum projected CPU usage samples, the first maximum projected CPU usage sample having the lowest value among the plurality of maximum projected CPU usage samples.

9. The cluster of claim 1, wherein the processor has further programmed instructions to copy memory pages from the first host device to the target host device.

10. A method comprising:
    identifying, for each host device of a plurality of host devices, a host central processing unit (CPU) usage of a plurality of host CPU usages;
    selecting at least a plurality of candidate host devices among the plurality of host devices based on host CPU usages of the respective host device;
    computing, for each candidate host device, a projected host CPU usage by adding a virtual machine CPU usage of a virtual machine to be migrated to the respective host CPU usage;
    selecting a target host device among the plurality of candidate host devices based on the respective projected host CPU usages of the target host device; and
    migrating the virtual machine from a first host of the plurality of host devices to the target host.

11. The method of claim 10, wherein selecting the plurality of candidate host devices among the plurality of host devices is responsive to receiving an indication of a contention on the first host device.

12. The method of claim 10, further comprising determining that each candidate host device of the candidate host devices has a first CPU usage of the plurality of host CPU usages, the first CPU usage decreasing a host threshold usage.

13. The method of claim 10, further comprising assigning a weight to each candidate host device based on the host CPU usage of the candidate host device.

14. The method of claim 13, wherein each of the plurality of host CPU usages comprises a plurality of host CPU usage samples, and wherein, for each candidate host device, the weight is inversely proportional to an average of the plurality of host CPU usage samples of the candidate host device.

15. The method of claim 10, wherein each projected CPU usage comprises a plurality of projected CPU usage samples, and wherein computing the projected CPU usage of the candidate host device comprises computing a sum of the host CPU usage of the candidate host device and a CPU usage of the virtual machine.

16. The method of claim 10, wherein selecting the target host device among the plurality of candidate host devices comprises determining, for each candidate host device, a maximum projected CPU usage sample of a plurality of maximum projected CPU usage samples, the maximum CPU usage sample having a highest value among the plurality of projected CPU usage samples of the candidate host device.

17. The method of claim 16, wherein each of the plurality of projected CPU usages comprises a plurality of projected CPU usage samples, and wherein selecting the target host device among the plurality of candidate host devices comprises determining a first candidate host device of the plurality of candidate host devices, the first candidate host device having a first maximum projected CPU usage sample of the plurality of maximum projected CPU usage samples, the first maximum projected CPU usage sample having the lowest value among the plurality of maximum projected CPU usage samples.

18. The method of claim 10, wherein migrating the virtual machine from the first host device to the target host device comprises copying memory pages from the first host device to the target host device.

19. A non-transitory computer-readable media storing computer readable instructions to cause a computer to perform a process comprising:
    identifying, for each host device of a plurality of host devices, a host central processing unit (CPU) usage of a plurality of host CPU usages;
    selecting at least a plurality of candidate host devices among the plurality of host devices based on host CPU usages of the respective host device;
    computing, for each candidate host device, a projected host CPU usage by adding a virtual machine CPU usage of a virtual machine to be migrated to the respective host CPU usage;
    selecting a target host device among the plurality of candidate host devices based on the respective projected host CPU usages of the target host device; and
    migrating the virtual machine from a first host of the plurality of host devices to the target host.

20. The non-transitory computer-readable media of claim 19, wherein selecting the plurality of candidate host devices among the plurality of host devices is responsive to receiving an indication of a contention on the first host device.

21. The non-transitory computer-readable media of claim 19, the instructions further comprising determining that each candidate host device of the candidate host devices has a first CPU usage of the plurality of host CPU usages, the first CPU usage decreasing a host threshold usage.

22. The non-transitory computer-readable media of claim 19, the instructions further comprising assigning a weight to each candidate host device based on the host CPU usage of the candidate host device.

23. The non-transitory computer-readable media of claim 22, wherein each of the plurality of host CPU usages comprises a plurality of host CPU usage samples, and wherein, for each candidate host device, the weight is inversely proportional to an average of the plurality of host CPU usage samples of the candidate host device.

24. The non-transitory computer-readable media of claim 19, wherein each projected CPU usage comprises a plurality of projected CPU usage samples, and wherein computing the projected CPU usage of the candidate host device comprises computing a sum of the host CPU usage of the candidate host device and a CPU usage of the virtual machine.

25. The non-transitory computer-readable media of claim 19, wherein selecting the target host device among the plurality of candidate host devices comprises determining, for each candidate host device, a maximum projected CPU usage sample of a plurality of maximum projected CPU usage samples, the maximum CPU usage sample having a highest value among the plurality of projected CPU usage samples of the candidate host device.

26. The non-transitory computer-readable media of claim 25, wherein each of the plurality of projected CPU usages comprises a plurality of projected CPU usage samples, and wherein selecting the target host device among the plurality of candidate host devices comprises determining a first candidate host device of the plurality of candidate host devices, the first candidate host device having a first maximum projected CPU usage sample of the plurality of maximum projected CPU usage samples, the first maximum projected CPU usage sample having the lowest value among the plurality of maximum projected CPU usage samples.

27. The non-transitory computer-readable media of claim 19, wherein migrating the virtual machine from the first host device to the target host device comprises copying memory pages from the first host device to the target host device.

* * * * *